Patented June 3, 1941

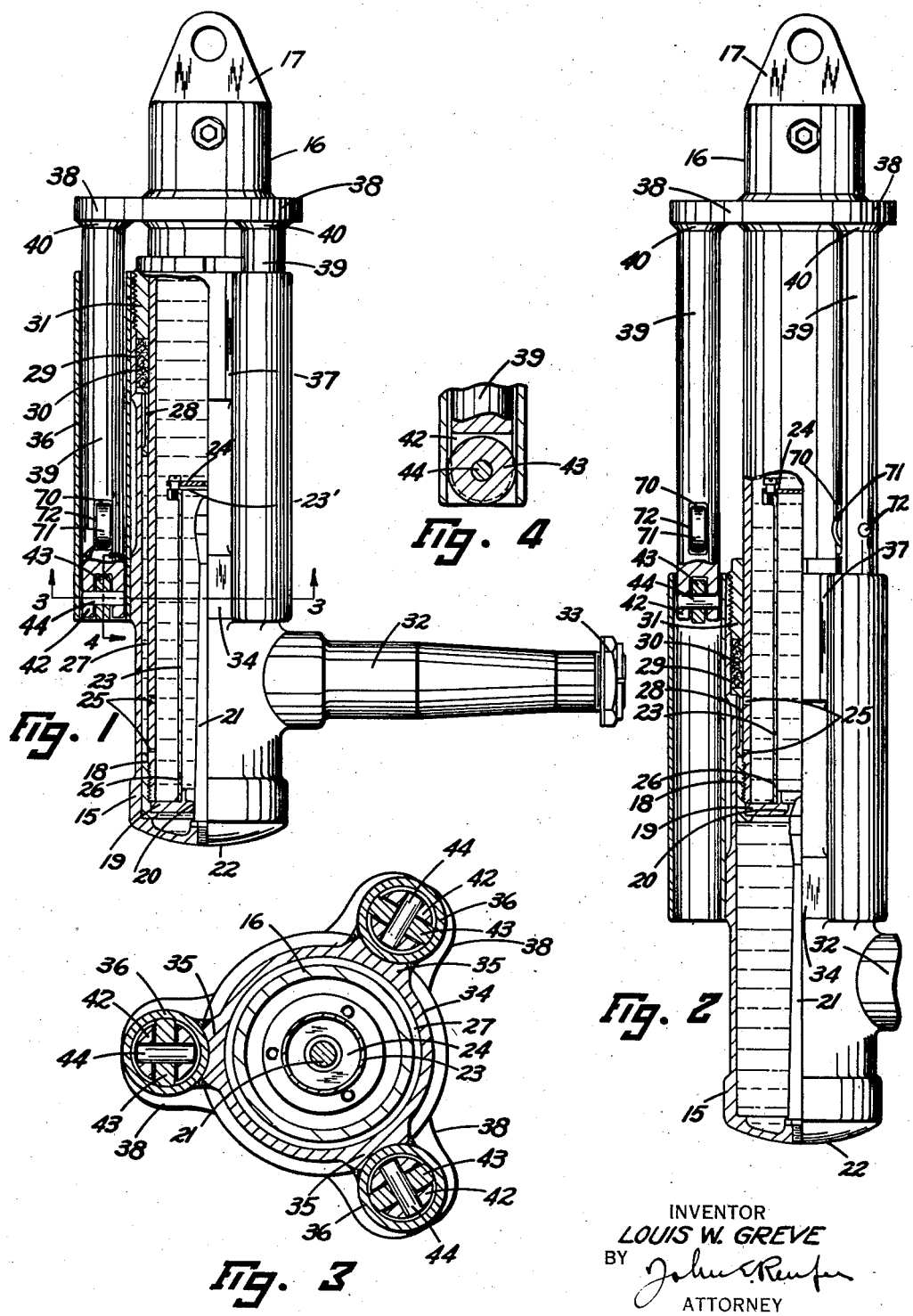

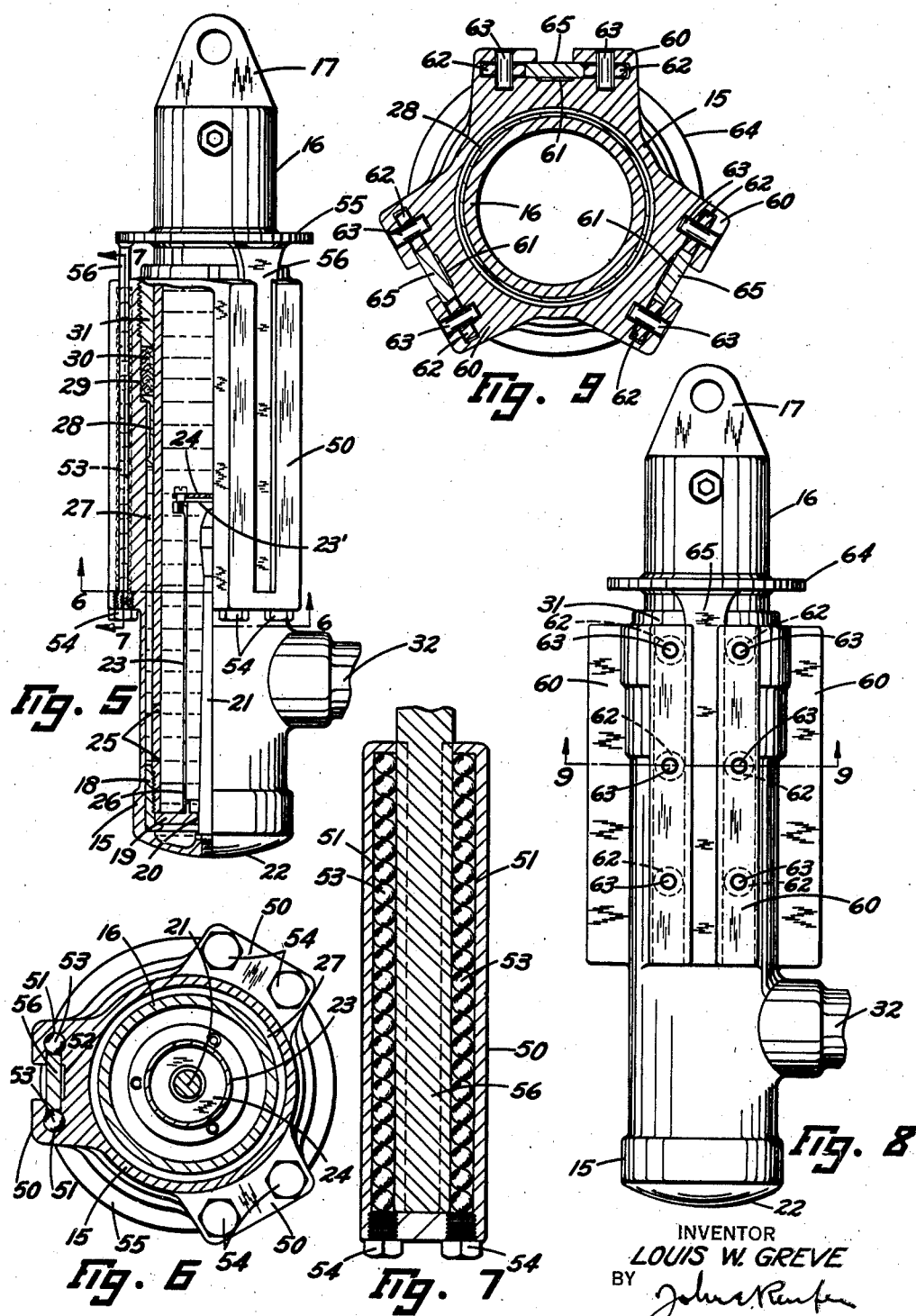

2,244,150

UNITED STATES PATENT OFFICE 2,244,150

SHOCK ABSORBING STRUT

Louis W. Greve, Cleveland, Ohio, assignor to The Cleveland Pneumatic Tool Company, Cleveland, Ohio, a corporation of Ohio Application February 6, 1939, Serial No. 254,758

6 Claims. (Cl. 244—104)

This invention relates broadly to shock absorbing struts, but more particularly to that type of struts designed for use on airplanes to cushion the impacts of landing and taxiing.

One of the objects of the invention is to provide the telescoping cylinders of such struts with cooperating external guides or the like preventing relative rotation of the cylinders, thereby maintaining the landing wheel carried by the lower cylinder in proper alignment relative to the airplane.

Other objects of this invention are to provide the telescoping cylinders of such shock absorbing struts with antifrictional rotation preventing means calculated to resist, with a minimum amount of friction, the torsional strain to which the cylinders are subjected.

Still another object of this invention is to provide the telescoping cylinders of such struts with rotation preventing means located externally of the cylinders, thereby reducing the manufacturing cost of the internal parts and enabling them to operate without interference in a highly satisfactory manner.

Other objects and advantages more or less ancillary to the foregoing reside in the specific construction and aggroupment of the elements peculiar to this structure, as will become apparent from a more complete examination of this specification.

Referring to the drawings:

Fig. 1 is a side elevational view partly in section of a shock absorbing strut embodying the invention, with the parts thereof shown in a fully compressed position.

Fig. 2 is a view similar to Fig. 1 with the parts shown in a fully extended position.

Fig. 3 is an enlarged cross sectional view taken in a plane indicated by line 3—3 in Fig. 1.

Fig. 4 is an enlarged fragmental longitudinally sectional view taken in a plane indicated by line 4—4 in Fig. 1.

Fig. 5 is a view similar to Fig. 1 showing the modification of the invention.

Fig. 6 is an enlarged cross sectional view taken in a plane indicated by line 6—6 in Fig. 5.

Fig. 7 is an enlarged longitudinal sectional view taken in a plane indicated by line 7—7 in Fig. 5.

Fig. 8 is a view similar to Fig. 1 showing another modification of the invention.

Fig. 9 is an enlarged cross sectional view taken in a plane indicated by line 9—9 in Fig. 8.

Referring to the drawings, the three constructions shown in Figs. 1, 5 and 8 all include a lower cylinder of a shock absorbing strut having telescopically mounted therein an upper cylinder 16 formed at its upper end with a clevis 17 for attachment of the shock absorbing strut to the craft. Affixed to the lower end of the cylinder 16, there is a piston 18 in slidable engagement with the inner wall of the cylinder 15, and a diaphragm 19 formed with a central orifice 20 through which is free to slide a metering pin 21 carried by the closed end 22 of the lower cylinder 15. The diaphragm 19 carries a metering pin housing 23 extending upwardly therefrom concentrically with the metering pin 21 and having its upper open end 23' controlled by a flap valve 24 operatively carried thereby. Near the piston 18, the cylinder 16 has one or more ports 25 extending through the side wall thereof, while the tube or metering pin housing 23 has a similar port 26 located near the diaphragm 19. Between the cylinders 15 and 16, there is a clearance or annular chamber 27 terminated at its lower end by the piston 18 and at its upper end by a bushing 28 having an annular flange resting on the bottom of a counterbore 29 forming the upper end of the lower cylinder 15. Above the bushings 28, the counterbore 29 accommodates packing rings 30 held in position by a gland nut 31, which packing rings form a fluid tight joint between the cylinders, while the nut 31, together with the bushing 28 and the piston 18, act as sliding bearings between the cylinders.

In the type of the construction shown, the lower cylinder 15 is provided with a laterally extending axle or spindle 32 preferably made an integral part of the cylinder on which is operatively mounted a landing wheel (not shown) held in position by a nut 33.

In practice, the cylinders are partly filled with liquid such as oil or the like, and with compressed air under a predetermined pressure, which compressed air tends to maintain the two cylinders 15 and 16 in the extended position shown in Fig. 2 and together with the displacement of the oil from the lower to the upper side of the diaphragm 19 through the orifice 20 act as a check or cushion for absorbing the landing or taxiing shocks tending to cause compression or contraction of the cylinders. During the recoil of the cylinders, the flap valve 22 will automatically close the upper open end 23' of the metering pin housing 23 and compel the liquid to flow from the upper to the lower side of the diaphragm 19 through the relatively small port 26, thereby checking the recoil movement of the cylinders. Since the strut mechanism calculated to absorb the landing and taxiing shocks does not actually form a part of this invention, no further description is thought necessary other than pointing out that any suitable shock absorbing construction between the two cylinders may be used without departing from the scope of the invention about to be described.

Referring now more particularly to the invention, in the construction shown in Figs. 1 to 4 inclusive, the cylinder 15 is provided with an external annular flange 34 formed with three equally spaced radially extending lugs 35, each machined to receive a tube or guideway 36 extending upwardly therefrom parallelly to the center axis of the strut, which tubes are preferably welded to the lugs 35 and also welded to the upper end of the lower cylinder as at 37. Above the cylinder 15, the cylinder 16 is provided with three equally spaced radially extending lugs 38, each having a rod or guide 39 rigidly secured thereto by any suitable means such as a weld 40. Each rod 39 is disposed coaxially with its corresponding tube 36 and extends therein for slidable movement relative thereto. The rod is preferably made of a diameter a few thousandths of an inch smaller than the inner diameter of the tube, thereby enabling free telescoping movement of the cylinders and tubes. The lower end of each rod is slotted as at 42 to receive a roller 43 rotatably mounted on a cross pin or shaft 44. If desired, each rod 39 may be provided with one or more additional rollers longitudinally spaced from each other and mounted in openings similar to the opening 70 having an additional roller 71 rotatably mounted therein on a cross pin 72. The shaft of each roller is disposed radially relative to the center axis of the strut, thereby positioning the rollers 43 and 71 within one vertical plane parallel to one tangent to the cylinder, and enabling the rollers to operatively contact or engage the inner wall of the tube 36 to resist relative rotation of the two cylinders about their common axis.

In the modification shown in Figs. 5 to 7 inclusive, the lower cylinder 15 is provided with three longitudinally extending bosses 50 preferably formed as an integral part of the cylinder. Each boss is formed with two cylindrical bores 51 parallel to the center axis of the strut and having cut between them a slot or guideway 52 of a substantially rectangular cross section, which slot also extends substantially the full length of the boss 50. As shown in Fig. 6, the narrowest width of the slot 52 is substantially smaller than the diameter of the bores 51, which bores are filled with balls 53 partly projecting into the slot 52 an extent less than half of their diameter, thereby preventing them from dropping into the slot. The bores 51 fall short of the upper end of the boss 50 and have their lower ends closed by removable plugs 54. Above the cylinder 15, the cylinder 16 is provided with an external annular flange 55 carrying three equally spaced bars or guides 56 of rectangular cross section, which guides extend from the flange 55 into the guideways 52 in coaxial alignment therewith for operative engagement with the balls 53 to prevent relative rotation of the cylinders. In the modification shown in Figs. 8 and 9, the lower cylinder 15 is provided with three longitudinally extending bosses 60 extending from the upper end thereof partway toward the lower end. Each boss 50 is formed with a T-shaped groove or guideway 61 extending the full length of the boss parallelly to the center axis of the strut. Mounted within the widest portion of the groove, there are rollers 62 rotatable on cross pins or shafts 63 carried by the boss 60, three of the rollers being mounted within one end portion of the groove in longitudinal alignment and three more being similarly mounted within the other end portion of the groove as clearly shown in Figs. 8 and 9. Above the cylinder 15, the cylinder 16 is provided with an external annular flange 64 carrying three equally spaced bars or guides 65 depending therefrom for slidable movement within the corresponding grooves 61, which bars are of a width calculated to engage the rollers 62 for preventing relative rotation of the cylinders.

From the foregoing description, it will be understood that the three constructions shown and described each include a shock absorbing strut having two telescoping cylinders held against rotation relative to one another by interengaging sliding guides mounted exteriorly of the cylinders, the guides being preferably equipped with longitudinally spaced antifriction bearings enabling free telescopic movement of the cylinders. In all the constructions shown and described, the guides and guideways are of a length calculated to assure their operative engagement irrespective of the position of the two cylinders relative to one another. It is also to be understood that the specific number of guides per struts, the cross sectional shape of the guides, and the type of antifriction bearings used and described are not intended to be restrictive or confining and that various rearrangements of parts and modifications of structural details may be resorted to without departing from the scope or spirit of the invention as herein claimed.

I claim:

1. In a shock absorber subjected to torsional strains, a pair of telescoping cylinders, means entirely enclosed within said cylinders for checking shocks, interfitting slidable guides outside of said cylinders rigidly attached to said cylinders for preventing relative rotation of the two cylinders upon their common axis, and antifriction means between said interfitting guides including a roller carried by one of said guides for operative engagement with diametrically opposed faces of the other guide.

2. In a shock absorber subjected to torsional strains, a pair of telescoping cylinders, interfitting slidable guides carried by said cylinders to prevent relative rotation of the two cylinders about their common axis, and antifriction means between said interfitting guides including a roller carried by one of said guides for operative engagement with the other guide irrespective of the direction of torsional strains to which said cylinders are subjected.

3. In a shock absorber subjected to torsional strains, upper and lower telescoping cylinders, upper and lower relatively slidable guide carried by said cylinders respectively, and a roller carried by one of said guides operatively engaging the other guide for preventing relative rotation in either direction of the two cylinders about their common axis.

4. In a device of the character described, a pair of telescoping cylinders, and means preventing relative rotation of the two cylinders on their common axis including a cylindrical guideway on one of the cylinders, a guide on the other cylinder slidable within said guideway, and longitudinally spaced rollers carried by said guide projecting laterally from two opposite sides thereof for operative engagement with the inner wall of said guideway.

5. In a shock absorber subjected to torsional strains, a pair of telescoping cylinders, means entirely enclosed within said cylinders for checking shocks, a guide outside of one cylinder rigidly secured thereto and extending longitudinally thereof, a longitudinally extending guideway outside of the other cylinder rigidly secured thereto, said guide being slidably mounted within said guideway, and a roller carried by the inner end portion of said guide for rotation on an axis disposed radially relative to the center axis of said cylinders, said roller engaging the inner wall of said guideway for preventing relative rotation of said cylinders.

6. In a shock absorber subjected to torsional strains, a pair of telescoping cylinders, means entirely enclosed within said cylinders for checking shocks, means for preventing relative rotation between said cylinders including telescoping guides rigidly secured to the exterior of said cylinders, and antifriction means between said guides including a roller carried by one of said guides for rotation on a radial axis relative to the center axis of said cylinders, said roller operatively engaging the other of said guides during telescoping movement of said cylinders.

LOUIS W. GREVE.